May 29, 1928.
F. BISZANTZ
1,671,884
DUMPING BODY
Filed Dec. 28, 1927        2 Sheets-Sheet 1
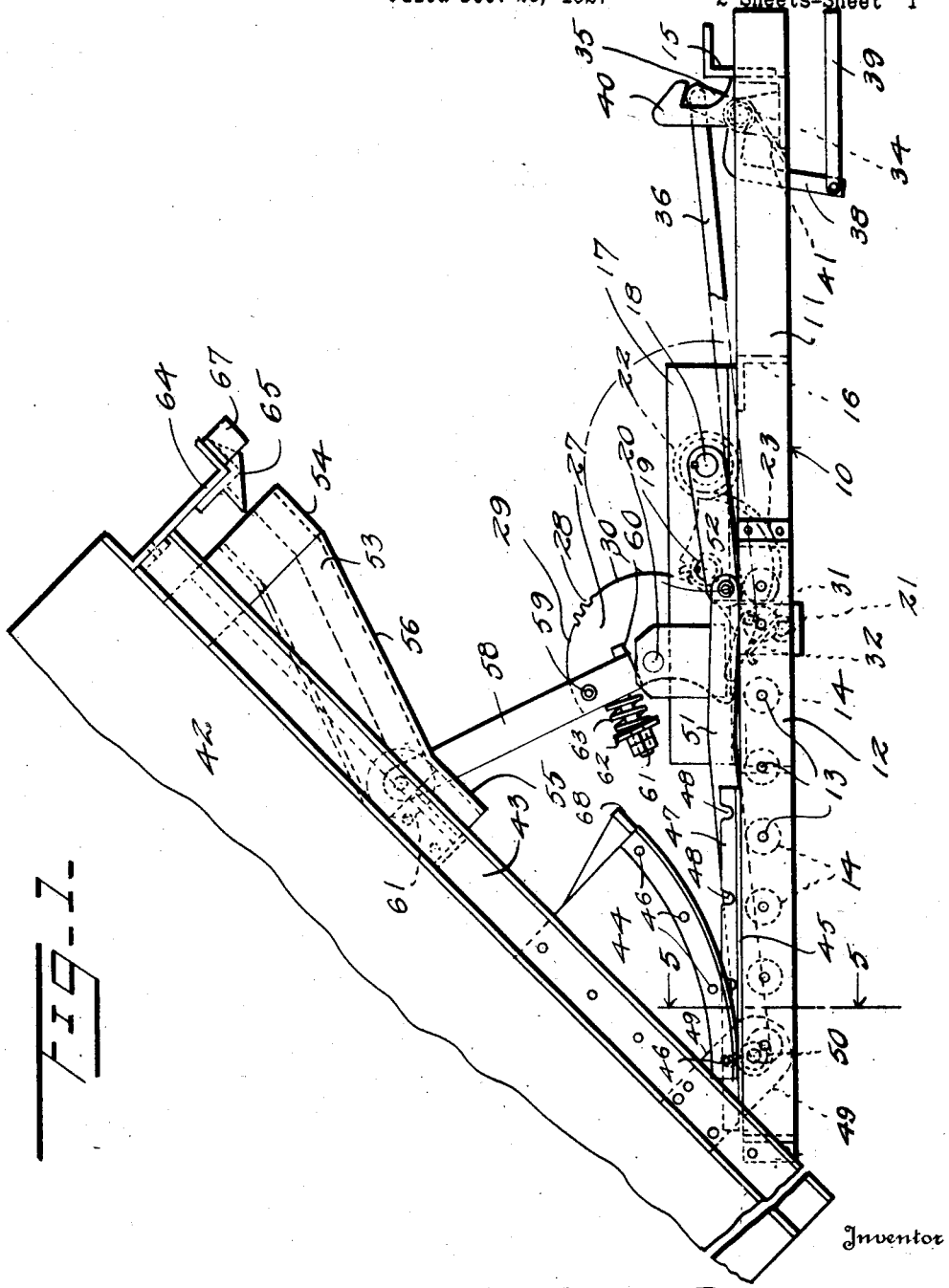
Inventor
Fred Biszantz

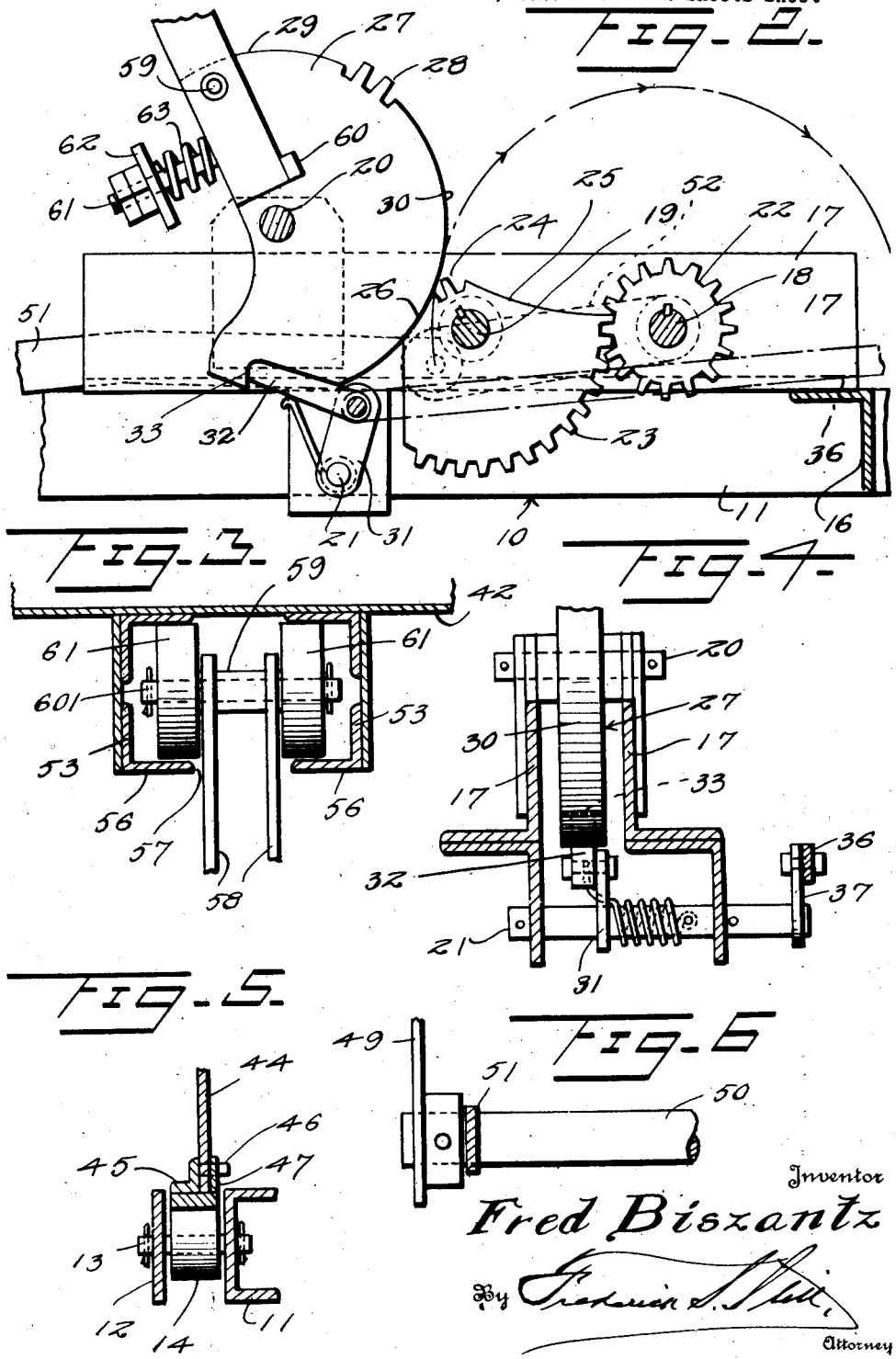

Patented May 29, 1928.

1,671,884

UNITED STATES PATENT OFFICE.

FRED BISZANTZ, OF GALION, OHIO, ASSIGNOR TO THE NATIONAL GRAVE VAULT CO., OF GALION, OHIO, A CORPORATION OF OHIO.

DUMPING BODY.

Application filed December 28, 1927. Serial No. 243,084.

This invention relates to dumping bodies for automobile trucks and more particularly to a dumping body which is both tilted and longitudinally shifted as it tilts.

An important object of the invention is to produce a device of this character which will be automatic in both its dumping and return movements and in which the principle illustrated in my prior application, Serial No. 226,989, filed October 18, 1927, for dumping bodies, of first elevating the forward end of the body without rearward movement to permit the body to clear all obstructions and then simultaneously elevating and longitudinally shifting the body, so as to clear the rear end of the chassis frame as the dumping action continues, is employed.

A further and more specific object of the invention is to provide means positively checking the dumping operation, which also serves as a means for imparting to the body a slight movement assisting the same in its return to the load transporting position.

A further object of the invention is to produce a structure of this character which may be readily and cheaply manufactured, which will be durable and efficient in service and a general improvement in the art.

These and other objects I attain by the construction shown in the accompanying drawings, wherein for the purpose of illustration is shown a preferred embodiment of my invention and wherein:—

Figure 1 is a side elevation showing a dumping body constructed in accordance with my invention, parts being illustrated in the dumping position;

Figure 2 is an enlarged longitudinal sectional view through the frame showing the mechanism controlling the longitudinal shifting of the body;

Figure 3 is a detail sectional view showing the manner in which the rollers of the tilting arms operate in the track provided therefor;

Figure 4 is a detail sectional view showing the tripping mechanism employed to apply an initial impulse to the thrust arms, positioning them to permit gravity return of the body;

Figure 5 is a detail sectional view on the line 5—5 of Figure 1;

Figure 6 is a detail view showing the cross shaft to which the shift arms are connected.

Referring now more particularly to the drawings, the numeral 10 generally designates a frame which may either be a part of or applied to the usual chassis frame of a motor vehicle. This frame includes side members 11, to the outer faces of which are secured the ends of plates 12. Between their ends, the plates 12 are in spaced relation to the side members 11 and coact with the side members to support pivot pins 13 of rollers 14, the upper surfaces of which are slightly below the upper surfaces of the plates 12 and side members 11. At their forward ends, the side members are connected by a transversely extending member 15 forming a bumper or sill. Intermediate their ends, the side members are connected by transversely extending supports 16 upon which are arranged at the approximate centers thereof longitudinally extending supports 17 in which are mounted the ends of shafts 18, 19 and 20. The supports 17 have depending flanges beneath and slightly in advance of the shaft 20 within which is journaled a rock shaft 21. The shaft 18 has mounted thereon a pinion 22 meshing with the tooth series 23 of a mutilated gear. This mutilated gear has a second tooth series 24, the ends of which are spaced from the ends of the tooth series 23 and connected thereto by re-entrantly curved faces 25 and 26. Upon the shaft 20 is mounted a segment 27 having a tooth series 28 for coaction with the tooth series 24 of the mutilated gear and at opposite sides of this tooth series 28, arcuately curved faces 29 and 30 for coaction with the re-entrantly curved faces 25 and 26 of the mutilated gear.

Upon the shaft 21 is secured an arm 31 having pivotally mounted thereon a pawl 32 spring-pressed into engagement with the periphery of the segment 27 at the curved face 30 thereof and adapted to engage against a shoulder 33 formed at one end of this face to check rotation of the segment in one direction. Immediately rearward of the transverse member 15 is disposed a transverse rock shaft 34 having a crank arm 35 connected by a link 36 with a similar crank arm 37 upon the rock shaft 21. This rock shaft 34 has a second crank arm 38 connected to an operating member 39 adapted to extend to the cab of the vehicle. The rock shaft has extending upwardly therefrom a latch hook 40 and the shaft is normally urged into operative position of the latch by a spring 41.

The numeral 42 designates a body and 43 the longitudinally extending under frame members thereof. In accordance with my invention, I secure to this body and more particularly to the frame members 43, rockers 44, the forward edges of which are located slightly forward of the center of gravity of the body. These rockers operate above the rollers 14, bars 45 being interposed between the faces of the rockers and the rollers. The rockers 44 have projecting from their inner faces, pins 46 spaced longitudinally of the rocker edges and the bars 45 are each provided with a flange 47 notched at intervals, as at 48, for the reception of these pins, so that the bars always occupy a fixed position with relation to the peripheries of the rockers. Likewise secured to the longitudinally extending frame members of the body are brackets 49 between which extends a shaft 50. This shaft 50 has engaged therewith adjacent the inner face of each bracket the rear end of a link 51, the forward ends of which are connected to throwback arms 52 secured to the ends of the shaft 18 outwardly of the longitudinal supports 17.

Secured to the body adjacent the forward end thereof are a pair of opposed longitudinally extending channels 53, which have their forward ends 54 spaced from the bottom of the body and their rear ends 55 engaged against the bottom of the body at the upper flanges thereof and between these points, incline upwardly and rearwardly toward the body, as indicated at 56. Adjacent edges of the channels are spaced from one another to provide a slot 57 permitting passage of a pair of transversely spaced arms 58. At their upper ends, these arms are maintained in separated relation by a spacer 59 mounted upon a pivot shaft 60 at the ends of which are mounted rollers 61, which are of slightly less diameter than the width of the channels and each operates in a channel 53. The lower ends of the arms 58 are mounted upon a pivot bolt 59 extending transversely through the segment 27 adjacent the periphery thereof at the curved face 29. Inwardly of the pivot bolt 59, the segment has stop lugs 60 against which the forward edges of the arms 58 may bear. Extending rearwardly from the segment and secured thereto is a post 61 having a spring seat 62 between which and the arms a spring 63 extends. These springs normally serve to maintain the arms in engagement with the lugs and the arms in a yieldingly fixed position with relation to the segment. At its forward end, the body has a transversely extending support 64 upon which is mounted a latch catch 65 for coaction with the latch element 40. This transversely extending support also provides a mounting for a sill engaging element 67 for engagement with the transversely extending sill 15 to provide a support for the forward end of the body when in transporting position. A support for the rear end of the body is provided by flat portions 68 at the forward ends of the rockers which, when the body is in the horizontal position, engage upon the upper surfaces of the side members 11 of the frame, so that a solid three point mounting for the body is provided at this time.

The operation is as follows:

With the body in dumping position, the latch pawl 32 is engaged with the shoulder 33 of the segment. At this time, the arms 58 have their rollers 61 engaged in the channels 53 adjacent the rear ends thereof and serve as a prop holding the forward end of the body in its dumping position. If, at this time, a pull is exerted on the operating member 39, this pull is transmitted through the rocker arm 38, shaft 34, rocker arm 35, link 36, arm 37, shaft 21 and rocker arm 31 to the pawl, shifting the pawl rearwardly and thereby causing the arms to oscillate forwardly. This forward movement causes a slight downward movement of the forward end of the body and the body then continues its movement by gravity as, at this time, the center of gravity lies forward of the pivotal support of the body which is at the rear end of the rockers 44. The tilting movement continues and by this tilting movement, the segment 27 is rotated, finally bringing the tooth series 28 and 24 into engagement.

The springs 63 serve as an absorber for the shock of such engagement. The engagement of these teeth causes a rotation of the mutilated gear with an accompanying rotation of the pinion 22. The rotation of the pinion 22 and its shaft 18 causes the throwback arms 52, which, in the dumping position extend rearwardly and slightly downwardly from the shaft, to shift to a position where they extend forwardly and slightly downwardly from the shaft and which is about 185° removed from the first named position. During this movement, the links 51 are shifted forwardly and through the shaft 50 and brackets 48 shift the body forwardly. During forward movement of the body, the pins 46, by their engagement in the notches of the bars, cause the bars to travel over the rollers until they reach their extreme forward position. At this time, the toothed engagement of the segment with the mutilated gear, discontinues and the curved portion 29 comes into coaction with the reentrantly curved portion 25 of the mutilated gear. From this point, forward movement of the body is discontinued and the tilting movement alone applied thereto. By this tilting movement, the latch catch 65 at the forward end of the body is brought into engagement with the latch element 40, locking the forward end of the body in its lowered position with the sill engaging elements 67 in engagement with the transverse sill 15. At the same time, the flat portions 68 come to rest upon the side members 11 to provide a support for the body and all load is taken from the rollers 14 and the bars or carriages.

Attention is directed to the fact that by providing the channels 53 with the angularly bent portions 56, when the body dumps, the pull of the track is against the bottoms of the rollers 61 and accordingly the action of these rollers upon the track will have a tendency to assist in the rearward movement of the body at the time the same is shifted. Similarly, when the body is released after dumping for return to its load transporting position, the angular portion of the track bears against the top of the rollers at the time the segment teeth start to mesh with the teeth of the mutilated gear, so that these teeth are held firmly in engagement without interfering with the tilting motion of the body and the inertia of the body is stored by the springs to assist in the shifting movement of the body. Prior to operation of the member 39 to cause a shift of the segment 27, the arms 58 are perpendicular to the angular portion 56 of the tracks with the result that a lock is provided, preventing return gravity movement until the position of these arms is disturbed.

It will be noted that the segment in its coaction with the re-entrantly curved faces of the mutilated gear serves to lock this mutilated gear against rotation and accordingly through engagement of the pinion 22 with the mutilated gear to lock the throw-back arms 52 against movement, so that at any time when the segment is engaged with either one of these faces, no longitudinal movement of the body can take place. Therefore, in loading and dumping positions and during the primary and final tilting movements of the body when moving from loading to dumping or dumping to loading positions, the body is locked against longitudinal movement. Further, since smooth faces of the segment and gear are in opposition to one another, there will be practically no resistance to the tilting movement during primary and final tilting operations. This is important in an automatic structure of this character, in that it enables the body to gain sufficient impetus to overcome the inertia of the body during the shifting period. This initial shifting movement, as in my prior application hereinbefore identified, also serves to permit the body to clear all obstructions before the longitudinal shift takes place. Carriages or bars moving upon the rollers provide a movable base for the rocker when the body is tilting while locked against longitudinal movement.

As the construction illustrated is obviously capable of a certain range of change and modification without materially departing from the spirit of the invention, I do not limit myself to such specific structure except as hereinafter claimed.

I claim:—

1. In a gravity dumping body, a frame, a body supported from the frame for longitudinal shifting and tilting movements thereon, an arm having connection with the frame and the body whereby it is oscillated as the body is tilted and other operative connections between said arm and the body whereby the oscillation of said arm shifts the body longitudinally, said connections being inoperative to cause longitudinal shifting movement of the body until the completion of a primary tilting movement of the body or during final tilting movement thereof.

2. In a gravity dumping body, a frame, a body supported from the frame for longitudinal shifting and tilting movements thereon, an arm having connection with the frame and the body whereby it is oscillated as the body is tilted and other operative connections between said arm and the body whereby the oscillation of said arm shifts the body longitudinally, said connections being inoperative to cause longitudinal shifting movement of the body until the completion of a primary tilting movement of the body or during final tilting movement thereof, and locking the body against longitudinal movement when inoperative to shift the same.

3. In a gravity dumping body assembly, a frame, a body supported upon the frame for longitudinal shifting and tilting movements thereon, an arm having connections with the frame and body whereby the arm is oscillated as the body tilts, a shaft extending transversely of and mounted in the frame and having crank arms, links connecting the crank arms and the body whereby upon rotation of the shaft the body is shifted longitudinally, and interrupted gearing connecting said shaft and arm whereby as the arm oscillates in response to a tilting movement of the body the shaft is at first stationary, is then rotated through a predetermined arc and is finally stationary during said tilting movement.

4. In a gravity dumping body, a frame, carriages freely longitudinally shiftably mounted thereon, a body, rockers for the body upon which the body tilts by gravity from loading to dumping and from dumping to loading positions operating upon said carriages, and means holding the body against longitudinal shifting movement during initial and final tilting movements while the carriages are shifted and operated by tilting of the body alone to shift the body and carriages longitudinally intermediate said initial and final tilting movements.

5. In a gravity dumping body, a frame, carriages freely longitudinally shiftably mounted thereon, a body, rockers for the body upon which the body tilts by gravity from loading to dumping and from dumping to loading positions operating upon said carriages, means holding the body against longitudinal shifting movement during initial and final tilting movements while the carriages are shifted and operated by tilting of the body alone to shift the body and carriages longitudinally intermediate said initial and final tilting movements and means maintaining the carriages against longitudinal movement with relation to the rockers supported thereby.

6. In a gravity dumping body, a frame, carriages freely longitudinally shiftably mounted thereon, a body, rockers for the body upon which the body tilts by gravity from loading to dumping and from dumping to loading positions operating upon said carriages, means holding the body against longitudinal shifting movement during initial and final tilting movements while the carriages are shifted, and operated by tilting of the body alone to shift the body and carriages longitudinally intermediate said initial and final tilting movements and means upon said rockers engaging the frame when the body is in loading position to support the body through the rockers while holding the weight of the body and rockers from said carriages.

7. In a gravity dumping body, a frame, carriages freely longitudinally shiftably mounted thereon, a body, rockers for the body upon which the body tilts by gravity from loading to dumping and from dumping to loading positions operating upon said carriages, means holding the body against longitudinal shifting movement during initial and final tilting movements while the carriages are shifted, and operated by tilting of the body alone to shift the body and carriages longitudinally intermediate said initial and final tilting movements, means maintaining the carriages against longitudinal movement with relation to the rockers supported thereby and means upon said rockers engaging the frame when the body is in loading position to support the body through the rockers while holding the weight of the body and rockers from said carriages.

8. In a gravity dumping body, a frame, a body supported from the frame for longitudinal shifting and tilting movements thereon, an arm having connection with the frame and the body whereby it is oscillated as the body is tilted, other operative connections between said arm and the body whereby the oscillation of said arm shifts the body longitudinally, the means supporting the body from the frame being such that the body moves automatically from loading to dumping positions and from dumping to loading positions, said arm when the body is in the dumping position having engagement with the body and frame preventing return movement of the body, means operable to shift the arm through a short distance to permit the body to move from dumping to loading positions by gravity, coacting latch elements upon the body and frame engaging when the body is in loading position and a single operating means for the latch element of the frame and the arm shifting means.

9. In a gravity dumping body, a frame having at opposite sides thereof pairs of opposed supports, rollers extending between the supports of each pair and having their upper surfaces below the upper edges thereof, a carriage bar slidable freely upon each group of rollers, a body, a rocker secured to the body for each carriage and engaging the carriage, said body tilting by gravity upon said rockers from loading to dumping and from dumping to loading positions, means holding the body against longitudinal shifting movements during initial and final tilting movements of the body while the carriages are shifted, said means being operated by tilting of the body alone and shifting the body and carriages longitudinally intermediate said initial and final tilting movements.

10. In a gravity dumping body, a frame having at opposite sides thereof pairs of opposed supports, rollers extending between the supports of each pair and having their upper surfaces below the upper edges thereof, a carriage bar slidable freely upon each group of rollers, a body, a rocker secured to the body for each carriage and engaging the carriage, said body tilting by gravity upon said rockers from loading to dumping and from dumping to loading positions, means holding the body against longitudinal shifting movements during initial and final tilting movements of the body while the carriages are shifted, said means being operated by tilting of the body alone and shifting the body and carriages longitudinally intermediate said initial and final tilting movements, said carriages each having at corresponding sides thereof a flange, said flange having longitudinally spaced notches, the rockers having pins for engagement in the notches of the flange to thereby maintain the carriages in fixed relation to the peripheries of the rockers.

In testimony whereof I affix my signature.

FRED BISZANTZ.